United States Patent [19]

Ottlinger et al.

[11] Patent Number: 4,762,937

[45] Date of Patent: Aug. 9, 1988

[54] METHOD FOR PREPARING LINEAR ORGANOPOLYSILOXANEDIOLS

[75] Inventors: Ralph Ottlinger, Murnau; Rudolf Reitmeier, Triftern, both of Fed. Rep. of Germany

[73] Assignee: Wacker-Chemie GmbH, Munich, Fed. Rep. of Germany

[21] Appl. No.: 82,606

[22] Filed: Aug. 6, 1987

[30] Foreign Application Priority Data

Aug. 29, 1986 [DE] Fed. Rep. of Germany ....... 3629381

[51] Int. Cl.[4] .................................................. C07F 7/08

[52] U.S. Cl. .................................................... 556/459

[58] Field of Search .......................................... 556/459

[56] References Cited

U.S. PATENT DOCUMENTS

| | | | |
|---|---|---|---|
| 2,758,124 | 8/1956 | Schwenker | 260/448.2 |
| 3,309,390 | 3/1967 | Omietanski | 556/459 |
| 3,449,392 | 6/1969 | Robinson | 556/459 |
| 3,853,932 | 12/1974 | Razzano | 556/459 |
| 3,939,195 | 2/1976 | Lücking et al. | 260/448.2 |
| 4,096,160 | 6/1978 | Ashby | 556/459 |
| 4,497,942 | 2/1985 | Yeboah et al. | 556/459 X |

FOREIGN PATENT DOCUMENTS

| | | | |
|---|---|---|---|
| 0658839 | 5/1965 | Belgium | 556/459 |
| 1088187 | 10/1967 | United Kingdom | 556/459 |

*Primary Examiner*—Paul F. Shaver

[57] ABSTRACT

Linear organopolysiloxanediols are prepared by continuously introducing cyclic organopolysiloxanes, water in an amount of at least 14 mols per gram atom of silicon contained in the cyclic organopolysiloxanes used and water-soluble acid into a recirculating reactor and thereafter separating the aqueous phase from the organopolysiloxanediols more or less immediately after the reaction mixture exits from the recirculating reactor.

4 Claims, No Drawings

METHOD FOR PREPARING LINEAR ORGANOPOLYSILOXANEDIOLS

The present invention relates to organopolysiloxanediols and more particularly to a method for preparing linear organopolysiloxanediols in a recirculating reactor.

BACKGROUND OF THE INVENTION

A method for preparing linear organopolysiloxanediols is described in U.S. Pat. No. 3,449,392 to Robinson, in which cyclic organopolysiloxanes are reacted with water in the presence of water-soluble acids and a water-miscible solvent.

It is an object of the present invention to provide a method for preparing linear organopolysiloxanediols by reacting a cyclic organopolysiloxane with water and a water-soluble acid at relatively low temperatures. Another object of the present invention is to provide a method for preparing linear organopolysiloxanediols at pressures which do not substantially exceed the pressure of the surrounding atmosphere. Still another object of the present invention is to provide a method for preparing linear organopolysiloxanediols in a continuous single-stage process with relatively high yields. A further object of the present invention is to provide a method for preparing linear organopolysiloxanediols by reacting cyclic organopolysiloxanes with water and a water-soluble acid and in the absence of substantial quantities of any other substances.

SUMMARY OF THE INVENTION

The foregoing objects and others which will become apparent from the following description are accomplished in accordance with this invention, generally speaking, by providing a method for preparing linear organopolysiloxanediols which comprises continuously introducing cyclic organopolysiloxanes, water in an amount of at least 14 mols per gram atom of silicon present in the cyclic organopolysiloxanes used and a water-soluble acid into a loop reactor and thereafter separating the aqueous phase from the organopolysiloxanediols after the reaction mixture exits from the loop reactor.

DESCRIPTION OF THE INVENTION

In the method of this invention, it is possible to use any of the cyclic organopolysiloxanes which have been or could have been used heretofore in known methods for preparing linear organopolysiloxanediols by reacting cyclic organopolysiloxanes with water in the presence of water-soluble acids. In the method of this invention, the preferred organopolysiloxanes are represented by the following formula $$(R\,R^1SiO)_x$$

where R represents the same or different hydrocarbon radicals and halogenated hydrocarbon radicals having from 1 to 18 carbon atoms per radical, $R^1$ represents hydrogen or is the same as R and x is an integer having a value of from 3 to 11.

Examples of hydrocarbon radicals represented by R are alkyl radicals, such as the methyl and the ethyl radical, as well as butyl, decyl and octadecyl radicals; hydrocarbon radicals containing at least one aliphatic multiple bond, such as the vinyl radical; aryl radicals, such as the phenyl radical; alkaryl radicals such as the tolyl radicals; and aralkyl radicals, such as the benzyl radical. Examples of halogenated hydrocarbon radicals represented by R are halogenalkyl radicals, such as the 3,3,3-trifluoropropyl radical and halogenaryl radicals, such as the o-, p- and m-chlorophenyl radicals. Because of their availability, it is preferred that at least 70 percent of the number of organic radicals in the cyclic organopolysiloxanes used in the method of this invention be methyl radicals.

Although it is possible to use only one type of cyclic organopolysiloxane, a mixture of two or more different types of organopolysiloxanes may be used as well, in which the difference may be the number of silicon atoms in the ring and/or different substituents on the silicon atoms.

It is preferred that the amount of water employed in the method of this invention not exceed about 200 mols and more preferably the amount of water employed should range from about 20 to 100 mols per gram atom of silicon contained in the cyclic organopolysiloxanes employed in order to avoid the need for an unnecessarily voluminous recirculating reactor and the pumping of unnecessarily large quantities.

In the method of this invention, it is possible to use as water-soluble acids, any of the acids which have been or could have been employed heretofore in the preparation of linear organopolysiloxanes by reacting cyclic organopolysiloxanes with water in the presence of water-soluble acids. These acids are especially Brönsted acids having an acid dissociation constant of at least $6.5 \cdot 10^{-2}$ at 25° C., such as hydrogen chloride, hydrobromic acid, hydroiodic acid, sulfuric acid, oxalic acid, perchloric acid, p-toluenesulfonic acid and trifluoroacetic acid, with sulfuric acid being the preferred acid.

It is possible to use only one type of Brönsted acid; however, mixtures of two or more different types of Brönsted acids may be used as well.

The concentration of the Brönsted acids used in the method of this invention preferably range from at least 5 to 75 percent by weight, based on the total weight of the water and the acid. The amount of acid used within this range depends, of course, on the solubility of the acid at the temperature at which the method of this invention is conducted.

When hydrogen chloride is used, from about 10 to 35 percent by weight is preferred, while with sulfuric acid from 40 to 68 percent by weight is preferably used and when perchloric acid is employed, then from about 5 to 20 percent by weight is preferred. All of these precentages are based on the total weight of the water and the acid. For other Brönsted acids, the optimal concentration can easily be determined by a simple test.

In the method of this invention, it is also possible to use as water-soluble acids, Lewis acids which have been mixed with water, such as $AlCl_3$, $BF_3$, $ZnCl_2$ or $SnCl_4$, or mixtures consisting of two or more different Lewis acids or mixtures comprising at least one Brönsted acid such as hydrogen chloride, and at least one Lewis acid, such as $FeCl_3$. When Lewis acids are used in the method of this invention, they are preferably used in an amount of from about 0.1 to 3 percent by weight based on the weight of the water.

In addition to the acids, it is possible to use as cocatalysts any of the compounds having the following formulas:

$NR^2_3HX$ $NR^2_4X$ $PR^2_3HX$ and $PR^2_4X$, where $R^2$ represents the same or different alkyl radicals having from 1 to 30 carbon atoms per radical and X is an inorganic anion. The examples of alkyl radicals enumerated heretofore as being representative of the R radicals are equally applicable to the $R^2$ radicals. Preferred examples of inorganic anions represented by X are those of the following formulas:

$Cl^-$, $Br^-$, $I^-$, $HSO_4^-$, $H_2PO_4^-$ and $FeCl_4^-$.

When co-catalysts are used, they are preferably employed in an amount of from 0.1 to 5 percent by weight, based on the weight of the cyclic organopolysiloxane used.

In the method of this invention, no particular advantage is obtained in using solvents, therefore, it is preferred that solvents be omitted from the method of this invention. If desired, however, the method of this invention can be carried out in the presence of solvents in an amount up to about 100 percent by weight, based on the weight of the cyclic organopolysiloxanes used.

Preferably, a silane or silanes having Si-bonded halogen are introduced with the cyclic organopolysiloxanes into the recycling reactor. The amount of silane or silanes having Si-bonded halogen which may be introduced into the recycling reactor may range from 0 up to 10 percent by weight, based on the weight of the cyclic organopolysiloxanes.

"Recycling" or "loop" reactors are generally known in the literature. (See "Encyklopädie der technischen Chemie", Volume 3, Weinheim 1973, page 350). The utilization of such reactors, which are referred to as "loops" for the reaction of organosilicon compounds with water, are described, for example, in U.S. Pat. No. 2,758,124 to Schwenker and in U.S. Pat. No. 3,939,195 to Lücking et al, which are incorporated herein by reference. They can be equipped with a device for heating or cooling their contents and may contain an additional loop which serves to increase the volume of the reactors. The material the loops are made of may consist of, for example, stoneware, glass, polytetrafluoroethylene or polypropylene.

Mixtures consisting of water, an acid or acids and one or several co-catalysts are preferably introduced into the loop reactor at a site other then that where the cyclic organopolysiloxanes enter the apparatus.

It is preferred that the contact time for the contents of the loop reactor be on the order of from 1 to 30 minutes and more preferably from about 5 to 20 minutes.

It is preferred that the rate at which the contents of the reactor are recycled be on the order of from 0.5 to 20 $m.s^{-1}$, and more preferably from about 3 to 5 $m.s^{-1}$.

The temperature of the contents of the loop reactor should be between 30 and 100° C. and more preferably between 50° and 95° C.

It is preferred that the pressure required to ensure recirculation within the loop reactor be that of the surrounding atmosphere, i.e., 1020 hPa (abs.) or approximately 1020 hPa (abs.). If desired, higher or lower pressures may be used as well, but they will not result in any additional advantages.

The continuous separation of the aqueous phase from the linear organopolysiloxanediols, which takes place more or less immediately after the reaction mixture exits from the loop reactor, is preferably carried out in 1 or more vertical or horizontal cylinders which are filled with glass wool. However, instead of glass wool, it is equally possible to use other acid-resistant, large-surface materials. Such separating devices for liquid-liquid systems are described, for example, in R. H. Perry and C. H. Chilton "Chemical Engineers' Handbook", 5th Edition, McGraw-Hill Book Company, New York, 1973, Section 21-12.

The aqueous phase can be recycled back into the loop reactor.

The desired organosiloxanediols having a viscosity of from 50 to 2000 $mm^2 \cdot s^{-1}$, may be separated by distillation at temperatures between 100° and 250° C. and at pressures up to 10 mbar from those substances which are volatile under these conditions, such as cyclic organopolysiloxanes and organosiloxanediols having very short chains. The linear organopolysiloxanediols, which under the conditions mentioned above, have been freed of volatile components, contain between 0.05 and 1 percent by weight of Si-bonded hydroxyl groups, based on the weight of the linear organopolysiloxanediols and are highly suitable for additional condensation for the preparation of high-molecular weight organopolysiloxanes. The volatile substances resulting from the distillation can be recycled back into the loop reactor.

All percentages and parts per million (ppm) in the following examples are by weight unless otherwise specified.

EXAMPLE 1

Aqueous sulfuric acid containing 56 percent sulfuric acid, based on the total weight of the water and the acid, and a mixture of cyclic dimethylpolysiloxanes having a silicon atom content between 3 and 11 silicon atoms per molecule and having a viscosity of 3.5 $mm^2 \cdot s^{-1}$ at 23° C., were fed into a loop reactor at separate locations and at a volume ratio of 1:1. The contents of the loop reactor were circulated with the aid of a recirculating pump and maintained by a heater at a temperature of 90° C. The average contact time of contents in the loop reactor was 12 minutes.

The reaction mixture, which steadily flows from the loop reactor, is passed through a horizontal glass wool-filled cylinder. The dimethylpolysiloxanediols which are separated from the aqueous phase as the upper phase, contain less than 1 ppm $H_2SO_4$. After the volatile constituents have been distilled off at 180° C. and 1 hPa (abs.), dimethylpolysiloxanediols are obtained which have an average viscosity of 536 $mm^2.s^{-1}$ at 23° C. and 0.28 percent Si-bonded hydroxyl groups, based on the weight of the organopolysiloxanes, and with a yield of 55.3 percent, based on the weight of the organopolysiloxanes initially employed.

EXAMPLE 2

The method described in Example 1 is repeated, except that a mixture consisting of 33 percent hydrogen chloride, 1 percent tetramethylammonium tetrachloroferrate and 65 percent water was substituted for the aqueous sulfuric acid and the contents of the loop reactor were heated to 70° C. instead of 90° C., and the average contact time of the contents in the reactor was doubled.

The components which boil at less than 180° C. and at 1 hPa (abs.) were distilled off, and the dimethylpolysiloxanediols were obtained in a yield of 42.6 percent, based on the weight of the organopolysiloxanes used. The dimethylpolysiloxanediols had an average viscosity of 307 $mm^2.s^{-1}$ at 23° C. and contained 0.39 percent of Si-bonded hydroxyl groups, based on the weight of the dimethylsiloxanediols.

What is claimed is:

1. A method for preparing linear organopolysiloxanediols, which comprises continuously introducing cyclic organopolysiloxanes, water in an amount of at least 14 moles per gram atom of silicon present in the cyclic organopolysiloxanes and a water-soluble acid catalyst selected from the group consisting of Brönsted acids having an acid dissociation constant of at least $6.5 \cdot 10^{-2}$ at 25° C., Lewis acids and mixtures thereof into a loop reactor while continuously separating the aqueous phase from the organopolysiloxanediols as the reaction mixture exits from the reactor.

2. The method of claim 1, wherein the water-soluble acid is sulfuric acid.

3. The method of claim 1, wherein from 0 to 10 percent by weight based on the weight of the cyclic organopolysiloxanes of a silane having Si-bonded halogen is introduced simultaneously with the cyclic organopolysiloxanes into the loop reactor.

4. The method of claim 1, wherein a co-catalyst is introduced into the loop reactor, in which the co-catalyst is selected from the group having the formulas, $NR^2_3HX$, $NR^2_4X$, $PR^2_3HX$ and $PR^2_4X$, where $R^2$ is an alkyl radical having from 1 to 30 carbon atoms and X is an inorganic anion.

* * * * *